(12) United States Patent
Cheng et al.

(10) Patent No.: US 11,232,545 B2
(45) Date of Patent: Jan. 25, 2022

(54) SYSTEMS AND METHODS FOR IMAGE PROCESSING

(71) Applicant: ZHEJIANG DAHUA TECHNOLOGY CO., LTD., Zhejiang (CN)

(72) Inventors: Min Cheng, Hangzhou (CN); Keqiang Yu, Hangzhou (CN)

(73) Assignee: ZHEJIANG DAHLIA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/864,038

(22) Filed: Apr. 30, 2020

(65) Prior Publication Data

US 2020/0258201 A1 Aug. 13, 2020

Related U.S. Application Data

(63) Continuation of application No. PCT/CN2018/113422, filed on Nov. 1, 2018.

(30) Foreign Application Priority Data

Nov. 2, 2017 (CN) .......................... 201711062678.2

(51) Int. Cl.
*G06T 5/00* (2006.01)
(52) U.S. Cl.
CPC .............. *G06T 5/003* (2013.01); *G06T 5/008* (2013.01); *G06T 5/009* (2013.01); *G06T 2207/10024* (2013.01)
(58) Field of Classification Search
CPC .......... G06T 5/008; G06T 5/009; G06T 5/003
See application file for complete search history.

(56) References Cited

U.S. PATENT DOCUMENTS 6,195,467 B1   2/2001 Asimopoulos et al.
6,438,270 B1 * 8/2002 Harrington ............... G06T 5/20
                                                    382/262
(Continued)

FOREIGN PATENT DOCUMENTS

CN          101197911 A     6/2008
CN          101355648 A     1/2009
(Continued)

OTHER PUBLICATIONS

International Search Report in PCT/CN2018/113422 dated Jan. 30, 2019, 5 pages.

(Continued)

*Primary Examiner* — David T Welch
(74) *Attorney, Agent, or Firm* — Metis IP LLC

(57) ABSTRACT

The present disclosure relates to systems and methods for image sharpening. The systems and methods may obtain a target image to be processed, the target image including one or more target pixels to be processed. For each of the one or more target pixels, the systems and methods may select one or more previous pixels and one or more subsequent pixels along a predetermined direction in the target image; determine a first gray value based on the one or more previous pixels and a second gray value based on the one or more subsequent pixels; select a target gray value from the first gray value and the second gray value based on an initial gray value of the target pixel; and determine an adjusted gray value of the target pixel based on the initial gray value and the target gray value.

18 Claims, 7 Drawing Sheets

(56) References Cited

U.S. PATENT DOCUMENTS

| | | | | |
|---|---|---|---|---|
| 6,633,409 B1* | 10/2003 | Yamazaki | ................ | H04N 1/56 358/1.9 |
| 2004/0252885 A1* | 12/2004 | Gondek | ............... | H04N 1/6019 382/162 |
| 2004/0257475 A1* | 12/2004 | Kim | ...................... | G06T 3/4007 348/581 |
| 2006/0087692 A1 | 4/2006 | Chang | | |
| 2006/0103615 A1* | 5/2006 | Shih | ..................... | G09G 3/3648 345/88 |
| 2006/0114526 A1* | 6/2006 | Hasegawa | ............ | G06T 3/4015 358/518 |
| 2011/0299795 A1* | 12/2011 | Shibata | ................. | G06T 3/4053 382/294 |
| 2012/0308154 A1* | 12/2012 | Tezaur | .................... | G06T 5/003 382/274 |
| 2013/0083248 A1* | 4/2013 | Suzuki | .................... | G06T 5/007 348/678 |
| 2013/0084014 A1* | 4/2013 | Huang | ................... | G06T 3/403 382/199 |
| 2014/0010472 A1 | 1/2014 | Xu | | |
| 2014/0146996 A1* | 5/2014 | Vajen | ................... | G06K 9/6289 382/100 |
| 2017/0169551 A1 | 6/2017 | Yang et al. | | |
| 2019/0385286 A1* | 12/2019 | Lai | ............................ | G06T 5/20 |

FOREIGN PATENT DOCUMENTS

| | | |
|---|---|---|
| CN | 102158714 A | 8/2011 |
| CN | 101667405 B | 9/2011 |
| CN | 102035997 B | 8/2012 |
| CN | 104166969 A | 11/2014 |
| CN | 105405108 A | 3/2016 |
| CN | 103763460 B | 4/2017 |
| CN | 107203982 A | 9/2017 |
| CN | 107292828 A | 10/2017 |
| WO | 2019085969 A1 | 5/2019 |

OTHER PUBLICATIONS

Written Opinion in PCT/CN2018/113422 dated Jan. 30, 2019, 6 pages.

The Extended European Search Report in European Application No. 18873036.0 dated Nov. 9, 2020, 8 pages.

Arcangelo Bruna et al., Adaptive Directional Sharpening with Overshoot Control, Proceedings of SPIE, 2008, 9 pages.

\* cited by examiner

SYSTEMS AND METHODS FOR IMAGE PROCESSING

CROSS-REFERENCE TO RELATED APPLICATIONS

This application is a continuation of International Application No. PCT/CN2018/113422 filed on Nov. 1, 2018, which claims priority of Chinese Patent Application No. 201711062678.2 filed on Nov. 2, 2017, the entire contents of which are incorporated herein by reference.

TECHNICAL FIELD

The present disclosure generally relates to systems and methods for imaging processing, and in particular, to systems and methods for image sharpening.

BACKGROUND

Image sharpening is an important image processing method. The purpose of image sharpening is to enhance edges in an image so that the edges become clear and the visual quality of the image is improved. At present, methods for image sharpening usually involves extracting high frequency information (which indicates edges) and low frequency information (which indicates homogeneous regions) of the image respectively, enhancing the high frequency information, and combining the enhanced high frequency information and the low frequency information as a processed image. However, in order to extract the high frequency information and the low frequency information of the image, complex filtering algorithms (e.g., a bilateral filtering algorithm, a Gaussian filtering algorithm) are needed. In addition, in order to determine an appropriate enhancement degree for the high frequency information, a complex region adaptive algorithm is needed. Therefore, it is desirable to provide efficient systems and methods for image sharpening, reducing algorithm complexity and processing load.

SUMMARY

An aspect of the present disclosure relates to a method for image sharpening. The method may include obtaining an image to be processed, the image to be processed including n pixels to be processed; for a pixel $P_i$ to be processed, performing the following operations for each of a plurality of predetermined directions: for any of the plurality of predetermined directions, designating the pixel $P_i$ to be processed as a center and determining a first gray value corresponding to $N_1$ pixels on one side of the pixel $P_i$ to be processed and a second gray value corresponding to $N_2$ pixels on the other side of the pixel $P_i$ to be processed, wherein $N_1$ and $N_2$ are integers greater than or equal to 1; selecting a gray value from the first gray value and the second gray value based on a numerical relationship among the first gray value, the second gray value, and a third gray value of the pixel $P_i$ to be processed; and adjusting the third gray value of the pixel $P_i$ to be processed based on the selected gray value; wherein i traverses any integer from 1 to n.

In some embodiments, selecting a gray value from the first gray value and the second gray value may include in response to the determination that the first gray value and the second gray value are both less than the third gray value, selecting the smaller one from the first gray value and the second gray value; and in response to the determination that the first gray value and the second gray value are both greater than the third gray value, selecting the larger one from the first gray value and the second gray value.

In some embodiments, selecting a gray value from the first gray value and the second gray value may include in response to the determination that the third gray value is greater than the first gray value and less than the second gray value, selecting the second gray value from the first gray value and the second gray value; and in response to the determination that the third gray value is greater than the second gray value and less than the first gray value, selecting the first gray value from the first gray value and the second gray value.

In some embodiments, adjusting the third gray value of the pixel $P_i$ to be processed based on the selected gray value may include adjusting the third gray value of the pixel $P_i$ to be processed according to the following equation:

$$Y_3 = \frac{1}{K_2}(Y_1 + Y_2) + \frac{K_1}{K_2}(Y_1 - Y_2),$$

wherein $Y_3$ refers to an adjusted third gray value of the pixel $P_i$ to be processed; $Y_1$ refers to the third gray value of the pixel $P_i$ to be processed before the adjustment; $Y_2$ refers to the selected gray value; $K_1$ refers to a first enhancement coefficient which is an integer greater than 1; $K_2$ refers to a second enhancement coefficient which is an integer greater than 0.

In some embodiments, in response to the determination that $N_1$ is an integer greater than 1, determining a first gray value corresponding to $N_1$ pixels on one side of the pixel $P_i$ to be processed may include designating a weighted sum of a plurality of gray values corresponding to the $N_1$ pixels as the first gray value; or designating an average gray value of the plurality of gray values corresponding to the $N_1$ pixels as the first gray value.

In some embodiments, in response to the determination that $N_2$ is an integer greater than 1, determining a second gray value corresponding to $N_2$ pixels on the other side of the pixel $P_i$ to be processed may include designating a weighted sum of a plurality of gray values corresponding to the $N_2$ pixels as the second gray value; or designating an average gray value of the plurality of gray values corresponding to the $N_2$ pixels as the second gray value.

In some embodiments, after obtaining the image to be processed, the method may further include in response to the determination that the image to be processed is a color image, performing a sharpening processing on a luma component image of the color image.

Another aspect of the present disclosure relates to a device for image sharpening. The device may include an obtaining module and a processing module. The obtaining module may be configured to obtain an image to be processed, the image to be processed including n pixels to be processed. The processing module may be configured to, for a pixel $P_i$ to be processed, perform the following operations for each of a plurality of predetermined directions: for any of the plurality of predetermined directions, designate the pixel $P_i$ to be processed as a center and determine a first gray value corresponding to $N_1$ pixels on one side of the pixel $P_i$ to be processed and a second gray value corresponding to $N_2$ pixels on the other side of the pixel $P_i$ to be processed, wherein $N_1$ and $N_2$ are integers greater than or equal to 1; select a gray value from the first gray value and the second gray value based on a numerical relationship among the first gray value, the second gray value, and a third gray value of the pixel $P_i$ to be processed; and adjust the third gray value of the pixel $P_i$ to be processed based on the selected gray value; wherein i traverses any integer from 1 to n.

In some embodiments, the processing module may be configured to, in response to the determination that the first gray value and the second gray value are both less than the third gray value, select the smaller one from the first gray value and the second gray value; and in response to the determination that the first gray value and the second gray value are both greater than the third gray value, select the larger one from the first gray value and the second gray value.

In some embodiments, the processing module may be configured to, in response to the determination that the third gray value is greater than the first gray value and less than the second gray value, select the second gray value from the first gray value and the second gray value; and in response to the determination that the third gray value is greater than the second gray value and less than the first gray value, select the first gray value from the first gray value and the second gray value.

In some embodiments, the processing module may be configured to adjust the third gray value of the pixel $P_i$ to be processed according to the following equation:

$$Y_3 = \frac{1}{K_2}(Y_1 + Y_2) + \frac{K_1}{K_2}(Y_1 - Y_2),$$

wherein $Y_3$ refers to an adjusted third gray value of the pixel $P_i$ to be processed; $Y_1$ refers to the third gray value of the pixel $P_i$ to be processed before the adjustment; $Y_2$ refers to the selected gray value; $K_1$ refers to a first enhancement coefficient which is an integer greater than 1; $K_2$ refers to a second enhancement coefficient which is an integer greater than 0.

In some embodiments, in response to the determination that $N_1$ is an integer greater than 1, the processing module may be configured to designate a weighted sum of a plurality of gray values corresponding to the $N_1$ pixels as the first gray value; or designate an average gray value of the plurality of gray values corresponding to the $N_1$ pixels as the first gray value.

In some embodiments, in response to the determination that $N_2$ is an integer greater than 1, the processing module may be configured to designate a weighted sum of a plurality of gray values corresponding to the $N_2$ pixels as the second gray value; or designate an average gray value of the plurality of gray values corresponding to the $N_2$ pixels as the second gray value.

In some embodiments, the processing module may be further configured to, after obtaining the image to be processed, in response to the determination that the image to be processed is a color image, perform a sharpening processing on a luma component image of the color image.

A further aspect of the present disclosure relates to a system for image processing. The system may include at least one storage medium including a set of instructions and at least one processor in communication with the at least one storage medium. When executing the set of instructions, the at least one processor may be directed to cause the system to perform one or more of the following operations. The system may obtain a target image to be processed, the target image including one or more target pixels to be processed. For each of the one or more target pixels, the system may select one or more previous pixels and one or more subsequent pixels along a predetermined direction in the target image. The system may determine a first gray value based on the one or more previous pixels and a second gray value based on the one or more subsequent pixels. The system may select a target gray value from the first gray value and the second gray value based on an initial gray value of the target pixel. The system may determine an adjusted gray value of the target pixel based on the initial gray value and the target gray value.

In some embodiments, a count of previous pixels used for determining the first gray value may be related to a global contrast of the target image.

In some embodiments, a count of subsequent pixels used for determining the second gray value may be related to a global contrast of the target image.

In some embodiments, a count of previous pixels used for determining the first gray value may be related to a local contrast of the target pixel.

In some embodiments, a count of subsequent pixels used for determining the second gray value may be related to a local contrast of the target pixel.

In some embodiments, the system may determine a weighed value of gray values of the one or more previous pixels as the first gray value, wherein for each of the one or more previous pixels, a weighting coefficient may be related to a first distance between the previous pixel and the target pixel.

In some embodiments, the system may determine a weighed value of gray values of the one or more subsequent pixels as the second gray value, wherein for each of the one or more subsequent pixels, a weighting coefficient may be related to a second distance between the subsequent pixel and the target pixel.

In some embodiments, in response to the determination that the first gray value and the second gray value are smaller than the initial gray value of the target pixel, the system may select the smaller one of the first gray value and the second gray value as the target gray value.

In some embodiments, in response to the determination that the first gray value and the second gray value are larger than the initial gray value of the target pixel, the system may select the larger one of the first gray value and the second gray value as the target gray value.

In some embodiments, in response to the determination that the initial gray value of the target pixel is larger than the first gray value and smaller than the second gray value, the system may select the second gray value as the target gray value.

In some embodiments, in response to the determination that the initial gray value of the target pixel is larger than the second gray value and smaller than the first gray value, the system may select the first gray value as the target gray value.

In some embodiments, the predetermined direction may include at least one of a horizontal direction, a vertical direction, a direction along 45 degrees, and/or a direction along 135 degrees.

In some embodiments, the system may determine luma component information of the target image in response to that the target image is a Red Green Blue (RGB) image.

A further aspect of the present disclosure relates to a method for image processing implemented on a computing device including at least one processor and at least one storage medium. The method may include obtaining a target image to be processed, the target image including one or more target pixels to be processed; for each of the one or more target pixels, selecting one or more previous pixels and one or more subsequent pixels along a predetermined direction in the target image; determining a first gray value based on the one or more previous pixels and a second gray value based on the one or more subsequent pixels; selecting a target gray value from the first gray value and the second gray value based on an initial gray value of the target pixel; and determining an adjusted gray value of the target pixel based on the initial gray value and the target gray value.

In some embodiments, a count of previous pixels used for determining the first gray value may be related to a global contrast of the target image.

In some embodiments, a count of subsequent pixels used for determining the second gray value may be related to a global contrast of the target image.

In some embodiments, a count of previous pixels used for determining the first gray value may be related to a local contrast of the target pixel.

In some embodiments, a count of subsequent pixels used for determining the second gray value may be related to a local contrast of the target pixel.

In some embodiments, determining a first gray value based on the one or more previous pixels and a second gray value based on the one or more subsequent pixels may include determining a weighed value of gray values of the one or more previous pixels as the first gray value, wherein for each of the one or more previous pixels, a weighting coefficient may be related to a first distance between the previous pixel and the target pixel.

In some embodiments, determining a first gray value based on the one or more previous pixels and a second gray value based on the one or more subsequent pixels may include determining a weighed value of gray values of the one or more subsequent pixels as the second gray value, wherein for each of the one or more subsequent pixels, a weighting coefficient may be related to a second distance between the subsequent pixel and the target pixel.

In some embodiments, selecting a target gray value from the first gray value and the second gray value based on an initial gray value of the target pixel may include in response to the determination that the first gray value and the second gray value are smaller than the initial gray value of the target pixel, selecting the smaller one of the first gray value and the second gray value as the target gray value.

In some embodiments, selecting a target gray value from the first gray value and the second gray value based on an initial gray value of the target pixel may include in response to the determination that the first gray value and the second gray value are larger than the initial gray value of the target pixel, selecting the larger one of the first gray value and the second gray value as the target gray value.

In some embodiments, selecting a target gray value from the first gray value and the second gray value based on an initial gray value of the target pixel may include in response to the determination that the initial gray value of the target pixel is larger than the first gray value and smaller than the second gray value, selecting the second gray value as the target gray value.

In some embodiments, selecting a target gray value from the first gray value and the second gray value based on an initial gray value of the target pixel may include in response to the determination that the initial gray value of the target pixel is larger than the second gray value and smaller than the first gray value, selecting the first gray value as the target gray value.

In some embodiments, the predetermined direction may include at least one of a horizontal direction, a vertical direction, a direction along 45 degrees, and/or a direction along 135 degrees.

In some embodiments, the method may further include determining luma component information of the target image in response to that the target image is a Red Green Blue (RGB) image.

A further aspect of the present disclosure relates to a non-transitory computer readable medium including executable instructions. When executed by at least one processor, the executable instructions may direct the at least one processor to perform a method including one or more of the above operations.

A further aspect of the present disclosure relates to a non-transitory computer readable medium including executable instructions. When executed by at least one processor, the executable instructions may direct the at least one processor to perform a method including one or more of the above operations.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
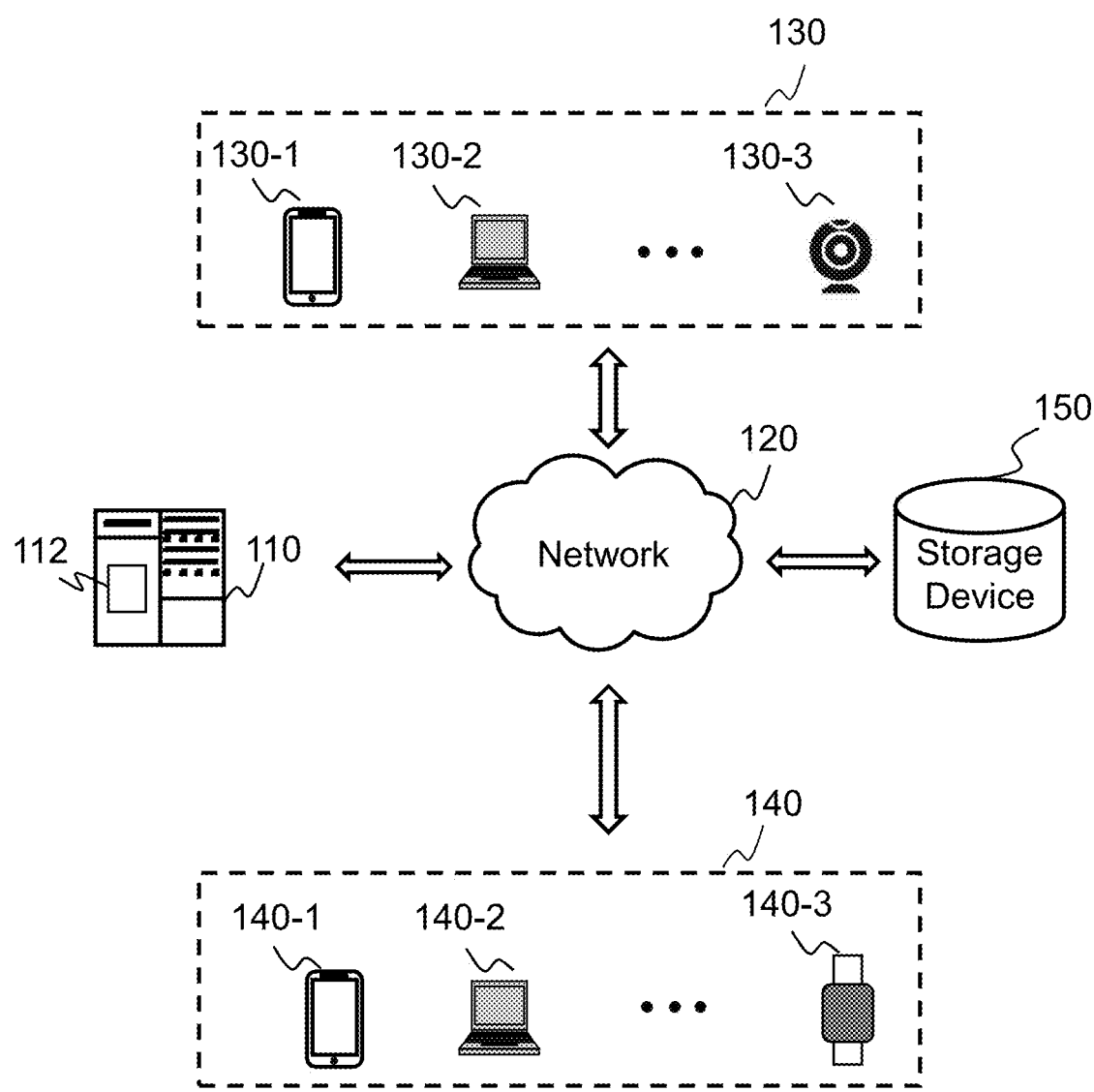
FIG. 1 is a schematic diagram illustrating an exemplary image processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "module," "unit," and/or "block" used herein are one method to distinguish different components, elements, parts, section or assembly of different level in ascending order. However, the terms may be displaced by other expression if they may achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a device, engine, module, unit, or block is referred to as being "on," "connected to," or "coupled to" another device, engine, module, unit, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used to distinguish the purpose of description, and cannot be interpreted as indicating or implying relative importance, nor can be understood as indicating or implying the order.

An aspect of the present disclosure relates to systems and methods for image sharpening. The systems and methods may obtain a target image to be processed, wherein the target image includes one or more target pixels to be processed. For each of the one or more target pixels, the systems and methods may select one or more previous pixels and one or more subsequent pixels along a predetermined direction in the target image. The systems and methods may determine a first gray value based on the one or more previous pixels and a second gray value based on one or more subsequent pixels. Further, the systems and methods may select a target gray value from the first gray value and the second gray value based on an initial gray value of the target pixel and adjust the initial gray value of the target pixel based on the target gray value. According to the systems and methods disclosed in the present disclosure, the gray value of a pixel can be adjusted based on gray values of pixels around the pixel, which needs a relatively low algorithm complexity, resulting in a relatively high processing efficiency.

The present disclosure may be implemented on any electronic device with an image processing function, such as a computer, a mobile phone, a smart camera device with an image processing function, etc. The present disclosure provides image sharpening methods and devices based on a visual phenomenon when human eyes view an image. Specifically, the visual phenomenon refers to a phenomenon that when white edges in the image become brighter and thinner and black edges become darker and thicker, the edges in the image may become clearer. According to the image sharpening methods and devices, it may be unnecessary to extract high frequency information and low frequency information of the image, and the gray value of the pixel to be processed may be directly adjusted, achieving the purpose of enhancing the pixel to be processed. Moreover, it may also be unnecessary to determine the enhancement degree for the pixel to be processed by using complex algorithms, and the target gray value used for enhancing the pixel to be processed may be determined simply by determining a numerical relationship among the initial gray value of the pixel to be processed and gray value(s) of at least one pixel located on two sides of the pixel to be processed. In this manner, the process for image sharpening may be simplified and the processing efficiency of image sharpening may be effectively improved.

FIG. 1 is a schematic diagram illustrating an exemplary image processing system according to some embodiments of the present disclosure. As shown, the image processing system 100 may include a server 110, a network 120, an acquisition device 130, a user device 140, and a storage device 150.

The server 110 may be a single server or a server group. The server group may be centralized or distributed (e.g., server 110 may be a distributed system). In some embodiments, the server 110 may be local or remote. For example, the server 110 may access information and/or data stored in the acquisition device 130, the user device 140, and/or the storage device 150 via the network 120. As another example, the server 110 may be directly connected to the acquisition device 130, the user device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 of the present disclosure.

In some embodiments, the server 110 may include a processing engine 112. The processing engine 112 may process information and/or data relating to image processing to perform one or more functions described in the present disclosure. For example, the processing engine 112 may sharpen an image based on gray value(s) of one or more pixels in the image. In some embodiments, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiment, the sever 110 may be unnecessary and all or part of the functions of the server 110 may be implemented by other components (e.g., the acquisition device 130, the user device 140) of the image processing system 100. For example, the processing engine 112 may be integrated in the acquisition device 130 or the user device 140 and the functions (e.g., sharpening an image) of the processing engine 112 may be implemented by the acquisition device 130 or the user device 140.

The network 120 may facilitate exchange of information and/or data for the image processing system 100. In some embodiments, one or more components (e.g., the server 110, the acquisition device 130, the user device 140, the storage device 150) of the image processing system 100 may send information and/or data to another component(s) of the image processing system 100 via the network 120. For example, the server 110 may obtain/acquire images from the acquisition device 130 via the network 120. As another example, the acquisition device 130 may transmit acquired images to the storage device 150. As a further example, the user device 140 may obtain processed images from the server 110 via the network 120. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof.

The acquisition device 130 may be configured to acquire an image (the "image" herein refers to a single image or a frame of a video). In some embodiments, the acquisition device 130 may include a mobile device 130-1, a computer 130-2, a camera device 130-3, etc. The computer 130-2 may include but not limit to a laptop, a tablet computer, a desktop, or the like, or any combination thereof. The camera device 130-3 may include but not limit to a gun camera, a dome camera, an integrated camera, a monocular camera, a binocular camera, a multi-view camera, or the like, or any combination thereof. The image acquired by the acquisition device 130 may be a two-dimensional image, a three-dimensional image, a four-dimensional image, etc. In some embodiments, the acquisition device 130 may include a plurality of components each of which can acquire an image. For example, the acquisition device 130 may include a plurality of sub-cameras that can take pictures or videos simultaneously. In some embodiments, the acquisition device 130 may transmit the acquired image to one or more components (e.g., the server 110, the user device 140, the storage device 150) of the image processing system 100 via the network 120.

The user device 140 may be configured to receive any information from the acquisition device 130, the server 110, and/or the storage device 150 via the network 120. For example, the user device 140 may receive a processed image from the server 110. In some embodiments, the user device 140 may provide a user interface via which a user can view information and/or input data and/or instructions to the image processing system 100. For example, the user may view a processed image obtained from the server 110 via the user interface. As another example, the user may input an instruction associated with a parameter of the image processing via the user interface. In some embodiments, the user device 140 may include a mobile device 140-1, a computer 140-2, a wearable device 140-3, etc. In some embodiments, the user device 140 may include a display for displaying a processed image or any intermediate information. The display of the user device 140 may include a cathode ray tube (CRT) display, a liquid crystal display (LCD), a light emitting diode (LED) display, a plasma display panel (PDP), a 3D display, or the like, or a combination thereof.

The storage device 150 may store data and/or instructions. The data and/or instructions may be obtained from, for example, the acquisition device 130, the server 110, and/or any other component of the image processing system 100. In some embodiments, the storage device 150 may store data and/or instructions that the server 110 may execute or use to perform exemplary methods described in the present disclosure. For example, the storage device 150 may store one or more images to be processed. As another example, the storage device 150 may store one or more images processed by the server 110. As a further example, the storage device 150 may store images acquired by the acquisition device 130 or any information (e.g., acquisition time, acquisition condition) associated with the images. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the acquisition device 130, the server 110, the user device 140) of the image processing system 100. One or more components of the image processing system 100 may access the data or instructions stored in the storage device 150 via the network 120. In some embodiments, the storage device 150 may be directly connected to or communicate with one or more components (e.g., the acquisition device 130, the server 110, the user device 140) of the image processing system 100. In some embodiments, the storage device 150 may be part of another component of the image processing system 100, such as the acquisition device 130, the server 110, or the user device 140.

It should be noted that the above description is merely provided for the purposes of illustration, and not intended to limit the scope of the present disclosure. For persons having ordinary skills in the art, multiple variations and modifications may be made under the teachings of the present disclosure. For example, the processing engine 112 may be integrated into the acquisition device 130. However, those variations and modifications do not depart from the scope of the present disclosure.

Figure 2:
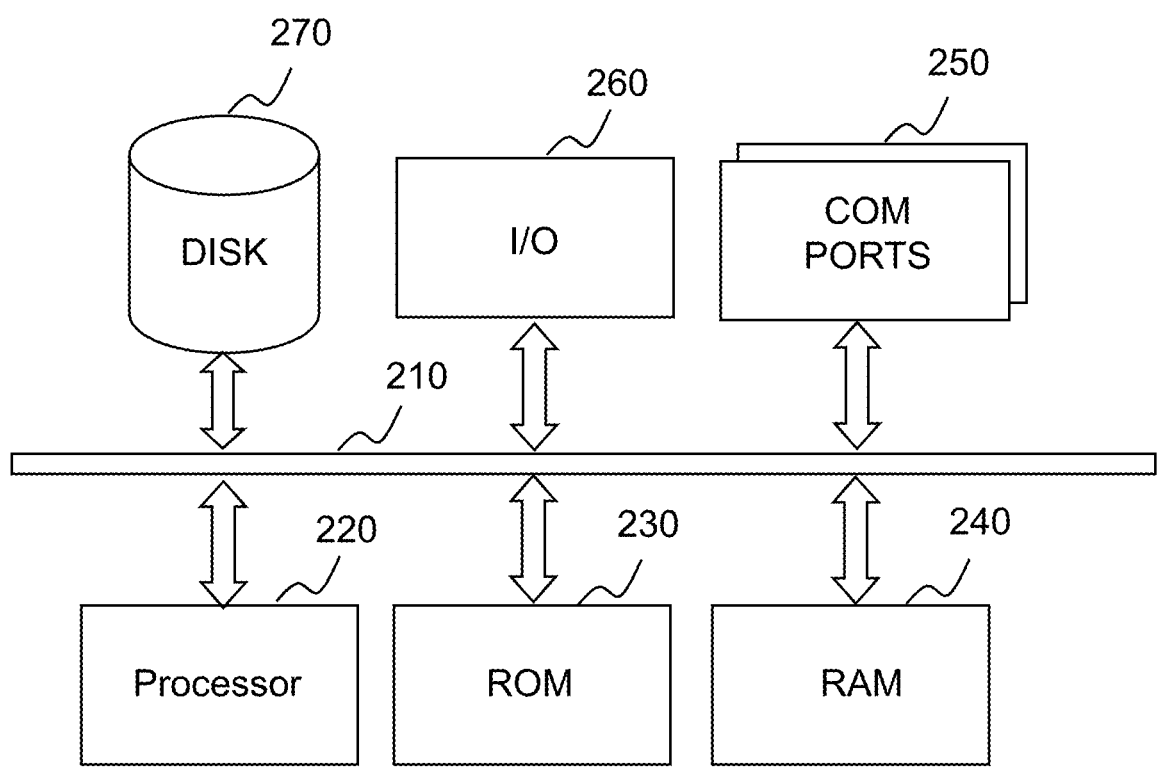
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200 shown in FIG. 2. For example, the processing engine 112 may be implemented on the computing device 200 and configured to perform functions of the processing engine 112 disclosed in this disclosure.

The computing device 200 may be used to implement any component of the image processing system 100 as described herein. For example, the processing engine 112 may be implemented on the computing device 200, via its hardware, software program, firmware, or a combination thereof. Although only one such computer is shown, for convenience, the computer functions relating to image processing as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing device may further include program storage and data storage of different forms including, for example, a disk 270, and a read-only memory (ROM) 230, or a random-access memory (RAM) 240, for various data files to be processed and/or transmitted by the computing device. The exemplary computing device may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computer and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3:
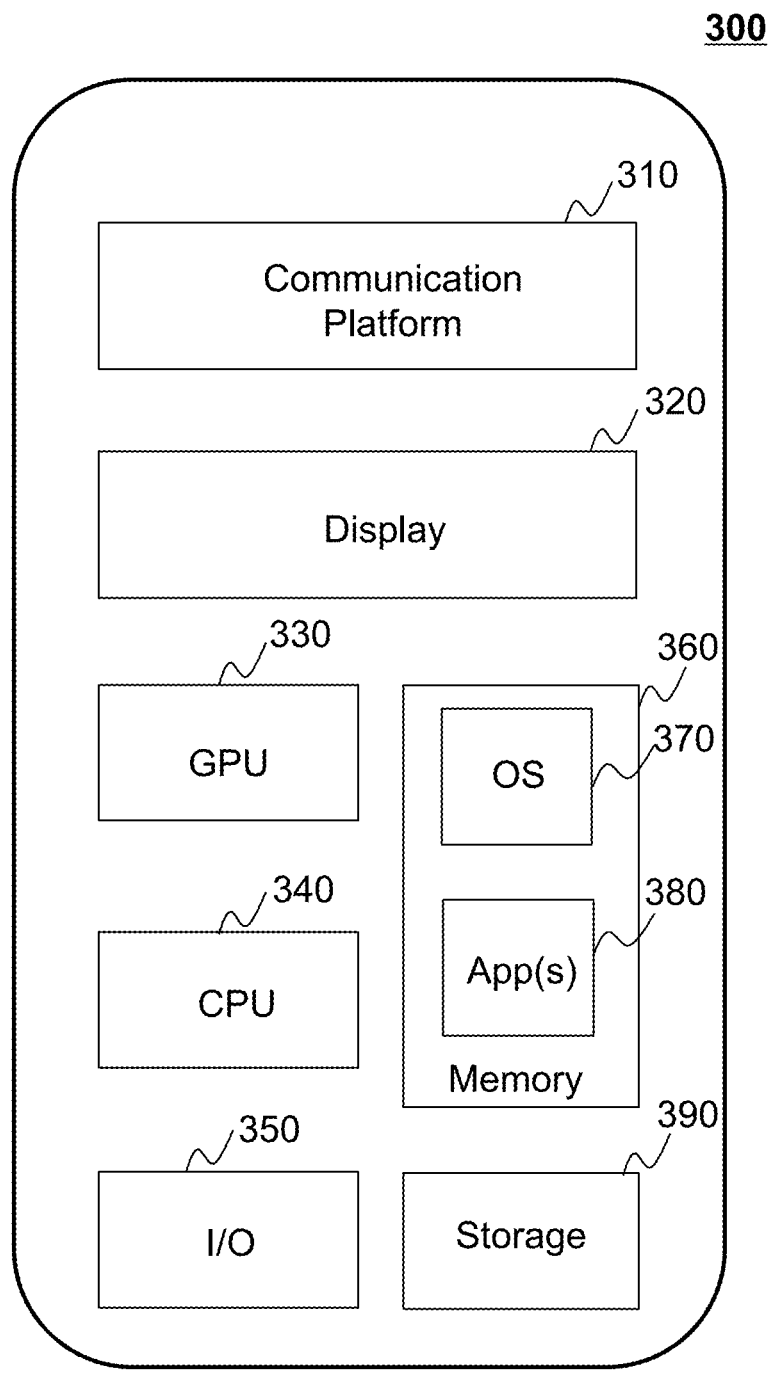
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device according to some embodiments of the present disclosure. In some embodiments, the user device 140 may be implemented on the terminal device 300 shown in FIG. 3. The terminal device 300 may be a mobile device, such as a mobile phone of a passenger or a driver, a built-in device on a vehicle driven by the driver. As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, an operating system 370 (e.g., iOS™, Android™, Windows Phone™, etc.) and one or more Apps (applications) 380 may be loaded into the memory 360 from the storage 390 in order to be executed by the CPU 340. User interactions may be achieved via the I/O 350 and provided to the server 110 and/or other components of the image processing system 100 via the network 120. The terminal device 300 may transmit/receive data related to the image to be processed via the communication platform 310. For example, the terminal device 300 may transmit the speech information to the server 110 via the communication platform 310.

Figure 4:
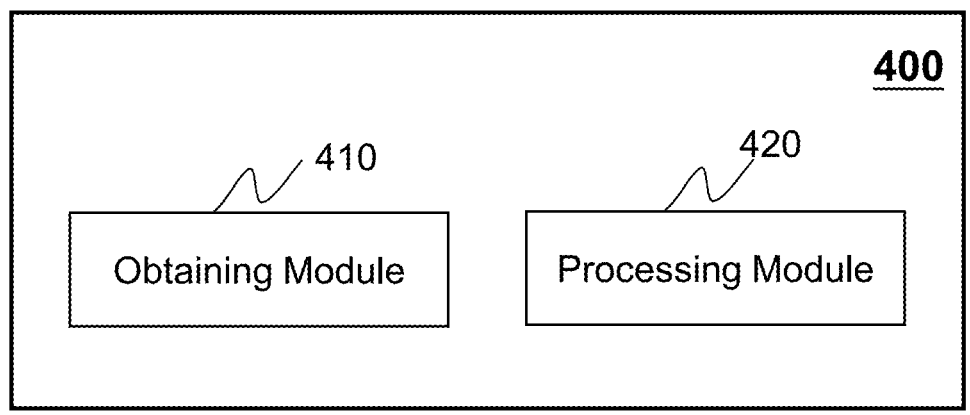
FIG. 4 is a block diagram illustrating an exemplary image sharpening device according to some embodiments of the present disclosure.

FIG. 4 is a block diagram illustrating an exemplary image sharpening device according to some embodiments of the present disclosure In some embodiments, the image sharpening device 400 may be implemented on the server 110 (e.g., the processing engine 112).

In some embodiments, the image sharpening device 400 may include an obtaining module 410 and a processing module 420. The obtaining module 410 may be configured to obtain an image to be processed (also referred to as a "target image"), wherein the image to be processed includes n pixels to be processed. The processing module 420 may be configured to, for a pixel $P_i$ to be processed (also referred to as a "target pixel"), perform operations 604-608 for each of a plurality of predetermined directions respectively.

In some embodiments, the processing module 420 may include a selection unit (not shown), a determination unit (not shown), an identification unit (not shown), and an adjustment unit (not shown). The selection unit may be configured to select one or more previous pixels and one or more subsequent pixels along a predetermined direction in the target image. The determination unit may be configured to determine a first gray value based on the one or more previous pixels and a second gray value based on the one or more subsequent pixels. The identification unit may be configured to select a target gray value from the first gray value and the second gray value based on an initial gray value of the target pixel. The adjustment unit may be configured to determine an adjusted gray value of the target pixel based on the initial gray value and the target gray value. More descriptions may be found elsewhere in the present disclosure (e.g., FIGS. 5-6 and the descriptions thereof).

The modules in FIG. 4 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. In some embodiments, two or more of the modules may be combined into a single module, and any one of the modules may be divided into two or more units.

Figure 5:
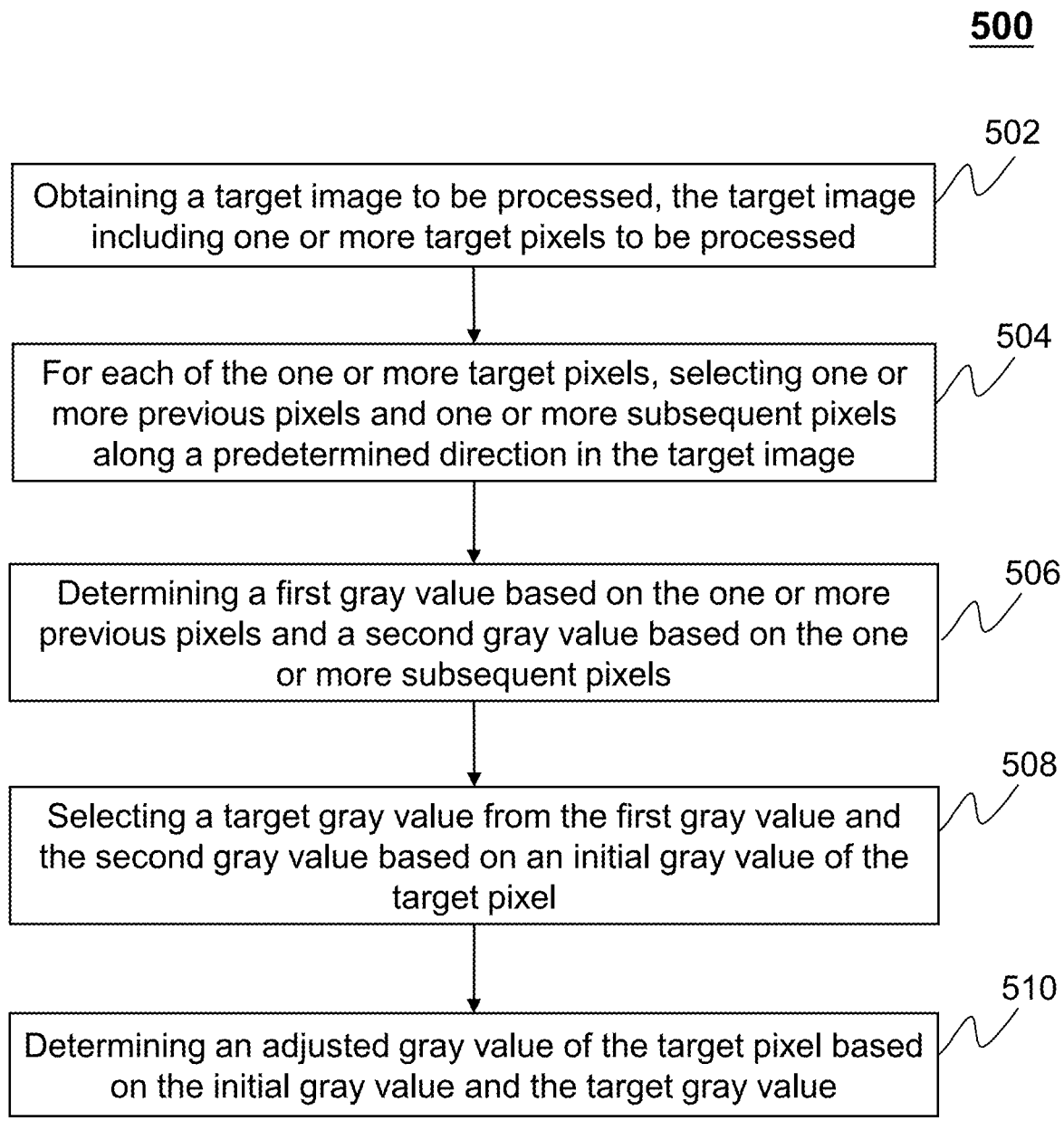
FIG. 5 is a flowchart illustrating an exemplary process for image processing according to some embodiments of the present disclosure.

FIG. 5 is a flowchart illustrating an exemplary process for image processing according to some embodiments of the present disclosure. In some embodiments, the process 500 may be executed by the image processing system 100. For example, the process 500 may be implemented as a set of instructions (e.g., an application) stored in a storage device (e.g., the ROM 230, the RAM 240). The processor 220 and/or modules in FIG. 4 may execute the set of instructions, and when executing the instructions, the processor 220 and/or the modules may be configured to perform the process 500. The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 502, the processing engine 112 (e.g., the obtaining module 410) may obtain a target image to be processed (e.g., to be sharpened), wherein the target image includes one or more target pixels to be processed. In some embodiments, the target image may be a two-dimensional (2D) image, a three-dimensional (3D) image, a four-dimensional (4D) image, etc. In some embodiments, the target image may be a grayscale image or a color image. Exemplary formats of the color image may include a Red Green Blue (RGB) format, a YCbCr format, a Hue-Saturation-Value (HSV) format, etc.

In some embodiments, in response to that the target image is a color image, the processing engine 112 may obtain luma component information (i.e., luminance information which is expressed as gray values of pixels) of the target image. For example, it is assumed that the target image is an RGB image, the processing engine 112 may convert the target image into a YCbCr image (where Y, Cb, and Cr represent a luma component, a blue chroma component, and a red chroma component respectively) and obtain luma component information based on the YCbCr image. The processing engine 112 may further determine a luma component image based on the luma component information.

In 504, for each of the one or more target pixels, the processing engine 112 (e.g., the processing module 420) may select one or more previous pixels and one or more subsequent pixels along a predetermined direction in the target image. As used herein, "previous pixels" refer to continuous pixels immediately before the target pixel along the predetermined direction, and "subsequent pixels" refer to continuous pixels immediately after the target pixel along the predetermined direction. In some embodiments, the predetermined direction may include a horizontal direction, a vertical direction, a direction along 30 degrees, a direction along 45 degrees, a direction along 60 degrees, a direction along 120 degrees, a direction along 135 degrees, a direction along 150 degrees, etc.

In some embodiments, a count (also referred to as a "first count" or $N_1$) of the previous pixels and/or a count (also referred to as a "second count" or $N_2$) of the subsequent pixels may be related to one or more features of the target image. For example, the first count and/or the second count may be related to a global contrast of the target image. The larger the global contrast of the target image is, the smaller the first count and/or the second count may be. As another example, the first count and/or the second count may be related to a local contrast of the target pixel. The larger the local contrast of the target pixel is, the smaller the first count and/or the second count may be. As used herein, the local contrast of the target pixel refers to a contrast of a region including the target pixel in the target image. In some embodiments, for a specific target pixel, the first count and the second count may be the same or different. In some embodiments, for a specific target pixel, for different predetermined directions, the first count and the second count may be the same or different.

In some embodiments, the first count and/or the second count may be default settings of the image processing system 100 or may be adjustable under different situations. For example, the first count and/or the second count may be dynamically adjusted according to a desired enhancement degree of the target image.

In 506, the processing engine 112 (e.g., the processing module 420) may determine a first gray value based on the one or more previous pixels and a second gray value based on the one or more subsequent pixels.

In some embodiments, the processing engine 112 may determine an average value of gray values of the one or more previous pixels as the first gray value. In some embodiments, the processing engine 112 may determine a weighted value of gray values of the one or more previous pixels as the first gray value, wherein for each of the one or more previous pixels, a weighting coefficient may be related to a first distance between the target pixel and the previous pixel, the smaller the first distance is, the larger the weighting coefficient may be.

In some embodiments, the processing engine 112 may determine an average value of gray values of the one or more subsequent pixels as the second gray value. In some embodiments, the processing engine 112 may determine a weighted value of gray values of the one or more subsequent pixels as the second gray value, wherein for each of the one or more subsequent pixels, a weighting coefficient may be related to a second distance between the target pixel and the previous pixel, the smaller the second distance is, the larger the weighting coefficient may be.

In 508, the processing engine 112 (e.g., the processing module 420) may select a target gray value from the first gray value and the second gray value based on an initial gray value of the target pixel. The target value may be used to enhance (e.g., sharpen) the target pixel. As used herein, "enhancing a pixel" refers to increasing a difference between an intensity (e.g., the gray value) of the pixel and intensities of pixels around the pixel.

In some embodiments, the processing engine 112 may select the target gray value based on a numerical relationship among the first gray value, the second gray value, and the initial gray value of the target pixel.

In some embodiments, in response to the determination that the first gray value and the second gray value are smaller than the initial gray value of the target pixel, the processing engine 112 may select the smaller one of the first gray value and the second gray value as the target gray value; in response to the determination that the first gray value and the second gray value are larger than the initial gray value of the target pixel, the processing engine 112 may select the larger one of the first gray value and the second gray value as the target gray value.

In some embodiments, in response to the determination that the initial gray value of the target pixel is larger than the first gray value and smaller than the second gray value, the processing engine 112 may select the second gray value as the target gray value; in response to the determination that the initial gray value of the target pixel is larger than the second gray value and smaller than the first gray value, the processing engine 112 may select the first gray value as the target gray value.

In 510, the processing engine 112 (e.g., the processing module 420) may determine an adjusted gray value of the target pixel based on the initial gray value and the target gray value.

For an ordinary person in the art, it is known that in a gray scale image or a luma component image, the larger a gray value of a pixel is (i.e., the larger the luminance of the pixel is), the closer to white the pixel may be, and the smaller the gray value of the pixel is (i.e., the smaller the luminance of the pixel is), the closer to black the pixel may be. Accordingly, in order to enhance the target pixel, in response to the determination that the target pixel is located on a white edge (i.e., an edge with relatively high luminance), the processing engine 112 may increase the initial gray value of the target pixel based on the target gray value; in response to the determination that the target pixel is located on a black edge (i.e., an edge with relatively low luminance), the processing engine 112 may decrease the initial gray value of the target pixel based on the target gray value; in response to the determination that the target pixel is located in a homogeneous region (i.e., gray values of pixels in the region are within a predetermined gray value range, wherein a size of the range is less than a size threshold), the processing engine 112 may remain the initial gray value of the target pixel unchanged; in response to the determination that the target pixel is located on a "gradient line" (i.e., the initial gray value of the target pixel is larger than the first gray value (corresponding to the one or more previous pixels) and smaller than the second gray value (corresponding to the one or more subsequent pixels) or the initial gray value of the target pixel is smaller than the first gray value and larger than the second gray value), the processing engine 112 may decrease the initial gray value of the target pixel based on the target gray value. As a result, after the adjustment, white edges may become brighter and thinner and black edges may become darker and thicker.

In some embodiments, the processing engine 112 may determine the adjusted gray value of the target pixel according to equation (1) described in operation 608. As described in connection with operation 508, in response to the determination that the first gray value and the second gray value are smaller than the initial gray value of the target pixel (which indicates that the target pixel is located on a white edge), the processing engine 112 may select the smaller one of the first gray value and the second gray value as the target gray value (which may be used to increase the initial value of the target pixel, resulting in that the white edge becomes brighter). In response to the determination that the first gray value and the second gray value are larger than the initial gray value of the target pixel (which indicates that the target pixel is located on a black edge), the processing engine 112 may select the larger one of the first gray value and the second gray value as the target gray value (which may be used to decrease the initial value of the target pixel, resulting in that the black edge becomes darker).

In response to the determination that the initial gray value of the target pixel is larger than the first gray value and smaller than the second gray value (which indicates that the target pixel is located on a "gradient line"), the processing engine 112 may select the second gray value as the target gray value; in response to the determination that the initial gray value of the target pixel is larger than the second gray value and smaller than the first gray value (which indicates that the target pixel is located on a "gradient line"), the processing engine 112 may select the first gray value as the target gray value. It can be seen that for a target pixel located on a "gradient line", a gray value larger than the initial gray value of the target pixel is selected as the target gray value, which may be used to decrease the initial value of the target pixel, resulting in that a black region (i.e., gray values of pixels in the region are relatively small) associated with the target pixel becomes larger and a white region (i.e., gray values of pixels in the region are relatively large) associated with the target pixel becomes smaller, thereby achieving an effect in which black edges become thicker and white edges become thinner.

As described in connection with operation 504, the predetermined direction may include a horizontal direction, a vertical direction, a direction along 30 degrees, a direction along 45 degrees, a direction along 60 degrees, a direction along 120 degrees, a direction along 135 degrees, a direction along 150 degrees, etc. In some embodiments, take a specific target pixel as an example, for each of the plurality of predetermined directions, the processing engine 112 may determine an intermediate adjusted gray value of the specific target pixel. Further, the processing engine 112 may determine an average value or a weighted value of the plurality of intermediate adjusted values as a final adjusted value of the specific target pixel.

In some embodiments, also take the specific target pixel as an example, the processing engine 112 may determine a first adjusted gray value of the specific target pixel based on previous pixels and subsequent pixels along a first direction (e.g., the horizontal direction). Further, on the basis of the first adjusted gray value (in this situation, the first adjusted gray value is considered as the "initial value" of the specific target pixel), the processing engine 112 may determine a second adjusted gray value of the specific target pixel based on previous pixels and subsequent pixels along a second direction (e.g., the direction along 45 degrees). Still further, on the basis of the second adjusted gray value (in this situation, the second adjusted gray value is considered as the "initial value" of the specific target pixel), the processing engine 112 may determine a third adjusted gray value of the specific target pixel based on previous pixels and subsequent pixels along a third direction (e.g., the vertical direction). The processing engine 112 may designate an ith adjusted gray value as a final adjusted value of the specific target pixel until a preset condition is satisfied, for example, a count of the predetermined directions is larger than a count threshold, an adjusted local contrast of the specific target pixel is larger than a contrast threshold, etc.

After determining the adjusted gray values of the one or more target pixels in the target image, the processing engine 112 may determine an adjusted target image based on the adjusted gray values of the one or more target pixels. In some embodiments, as described in connection with operation 502, it is assumed that the target image is a color image, the processing engine 112 may combine the adjusted gray values of the one or more target pixels, the blue chroma component information, and the red chroma component information to determine the adjusted target image.

In some embodiments, the processing engine 112 may transmit the adjusted target image to the user device 140. The user device 140 may display the adjusted target image via a user interface. In some embodiments, the processing engine 112 may transmit the adjusted target image to the storage device 150.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 500. In the storing step, the processing engine 112 may store information (e.g., the first gray value, the second gray value, the target gray value, the adjusted gray value) associated with the target image in a storage device (e.g., the storage device 150) disclosed elsewhere in the present disclosure.

Figure 6:
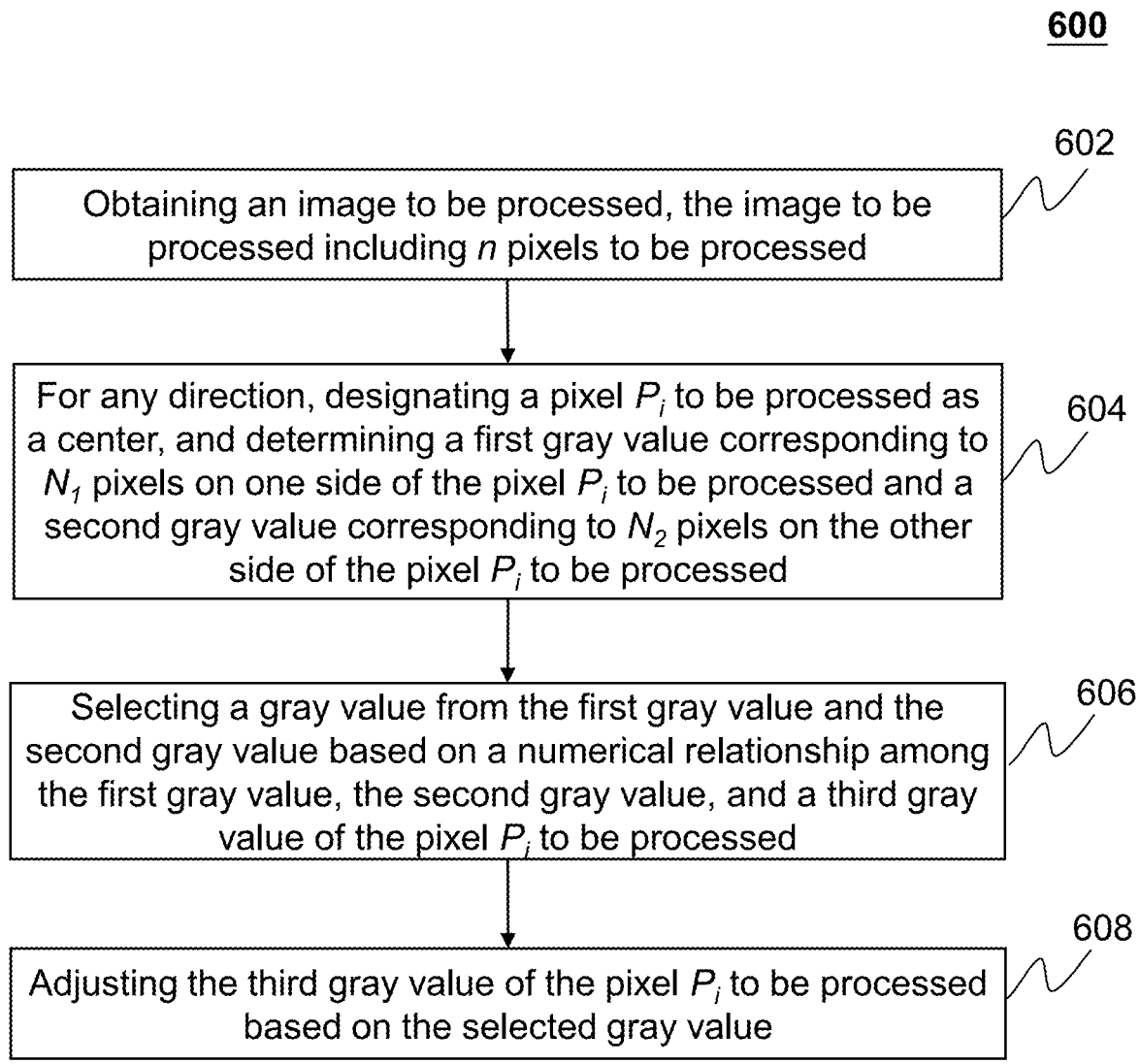
FIG. 6 is a flowchart illustrating an exemplary process for image sharpening according to some embodiments of the present disclosure.

FIG. 6 is a flowchart illustrating an exemplary process for image sharpening according to some embodiments of the present disclosure. In some embodiments, the process 600 may be executed by the image processing system 100. For example, the process 600 may be implemented as a set of instructions (e.g., an application) stored in a storage device (e.g., the ROM 230, the RAM 240). The processor 220 and/or modules in FIG. 4 may execute the set of instructions, and when executing the instructions, the processor 220 and/or the modules may be configured to perform the process 600. The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In 602, an image to be processed (also referred to as a "target image") may be obtained, wherein the image to be processed includes n pixels to be processed. As used herein, n may be an integer greater than 1 and less than or equal to a total count of pixels in the image to be processed.

Specifically, after the image to be processed is obtained, a type of the image to be processed may be determined. In response to the determination that the type of the image to be processed is a grayscale image, a sharpening process may be directly performed and the following operations may be executed. As used herein, the grayscale image only includes a luma component without a color component. The luminance variation in the grayscale image may be continuous. A gray value in the grayscale image may be considered as a value of the luma component of the image.

In response to the determination that the type of the image to be processed is a color image, the color image may be converted into a luma component image and a chroma component image. The color image may be an original RGB image. A color space transformation may be performed on the original RGB image and the original RGB image may be converted into a YCbCr spatial image. As used herein, R, G, and B represent a red component, a green component, and a blue component respectively in the original RGB image, and Y, Cb, and Cr represent a luma component, a blue chroma component, and a red chroma component respectively in the YCbCr spatial image, wherein Y represents the "gray value". Then, a sharpening processing may be performed on the luma component image of the color image and the following operations (operations 604 to 608) may be executed.

For a pixel $P_i$ to be processed (also referred to as a "target pixel") in the image to be processed, operation 604 to operation 608 may be performed for each of a plurality of predetermined directions respectively. As used herein, i may traverse any integer from 1~n.

Figure 7:
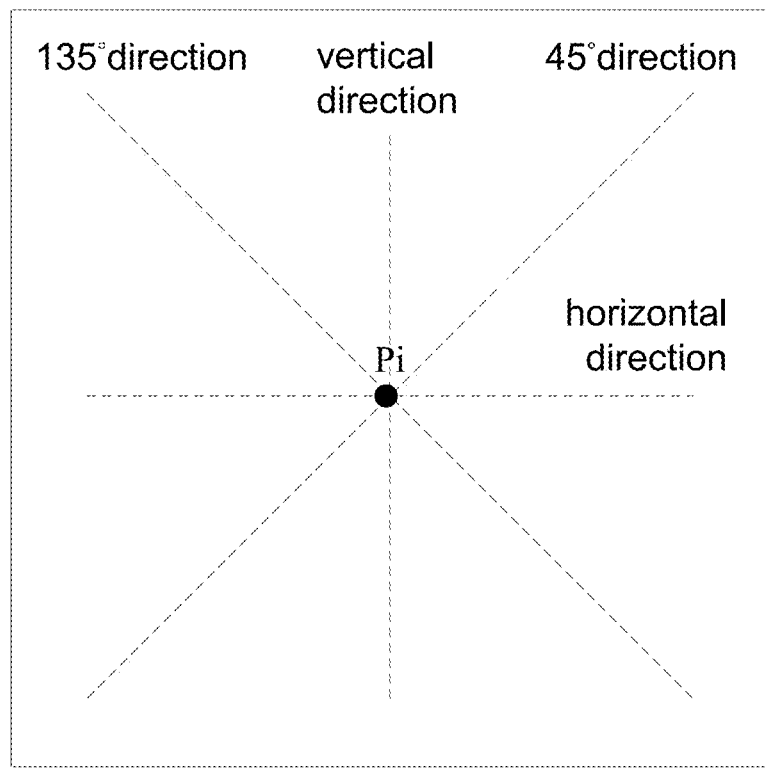
FIG. 7 is a schematic diagram illustrating exemplary directions for image sharpening according to some embodiments of the present disclosure.

In order to facilitate the understanding of the plurality of predetermined directions, exemplary predetermined directions are shown in a schematic diagram (FIG. 7). Take the pixel $P_i$ to be processed as a base, a direction 1 may be represented as a horizontal direction, a direction 2 may be represented as a vertical direction, a direction 3 may be represented as a direction along 45 degrees, and a direction 4 may be represented as a direction along 135 degrees. Of course, the directions are provided for illustration purposes and in specific embodiments, the plurality of predetermined directions may be set according to actual needs and the order of the plurality of predetermined directions may also be set according to actual needs, which are not limited by the present disclosure. For example, the plurality of predetermined directions may also include a direction along 30 degrees, a direction along 60 degrees, a direction along 120 degrees, a direction along 150 degrees, etc.

In 604, for any direction, a pixel $P_i$ to be processed may be designated as a center, and a first gray value corresponding to $N_1$ pixels (also referred to as "previous pixels) on one side of the pixel $P_i$ to be processed and a second gray value corresponding to $N_2$ pixels (also referred to as "subsequent pixels) on the other side of the pixel $P_i$ to be processed may be determined.

As used herein, both $N_1$ and $N_2$ may be integers greater than or equal to 1. The value of $N_1$ and the value of $N_2$ may be the same or different, or may be set according to actual needs. In some embodiments, the value of $N_1$ and/or the value of $N_2$ may be related to a local contrast of the pixel $P_i$ to be processed and/or a global contrast of the target image. In some embodiments, the value of $N_1$ and/or the value of $N_2$ may be default settings of the image processing system 100 or may be adjustable under different situations. For example, the value of $N_1$ and/or the value of $N_2$ may be dynamically adjusted according to a desired enhancement degree of the target image. More descriptions of the value of $N_1$ and/or the value of $N_2$ may be found elsewhere in the present disclosure (e.g., FIG. 5 and the description thereof). When the above operation is performed according to different directions, the values of $N_1$ may be the same or different, and the values of $N_2$ may be the same or different.

Specifically, it is assumed that the value of $N_1$ is equal to 1, the first gray value may be a gray value of a pixel located on one side of the pixel $P_i$ to be processed and adjacent to the pixel $P_i$ to be processed. Similarly, it is assumed that the value of $N_2$ is equal to 1, the second gray value may be a gray value of a pixel located on the other side of the pixel $P_i$ to be processed and adjacent to the pixel $P_i$ to be processed.

It is assumed that the value of $N_1$ is an integer greater than 1, determining the first gray value corresponding to the $N_1$ pixels located on one side of the pixel $P_i$ to be processed specifically includes: determining a weighted sum of gray values corresponding to the $N_1$ pixels as the first gray value; or determining an average value of the gray values corresponding to the $N_1$ pixels as the first gray value. In some embodiments, for each of the $N_1$ pixels, a weighting coefficient may be related to a first distance between the pixel and the pixel $P_i$ to be processed.

Similarly, it is assumed that the value of $N_2$ is an integer greater than 1, determining the second gray value corresponding to the $N_2$ pixels located on the other side of the pixel $P_i$ to be processed specifically includes: determining a weighted sum of gray values corresponding to the $N_2$ pixels as the second gray value; or determining an average value of the gray values corresponding to the $N_2$ pixels as the second gray value. In some embodiments, for each of the $N_2$ pixels, a weighting coefficient may be related to a second distance between the pixel and the pixel $P_i$ to be processed.

In 606, a gray value (also referred to as the "target gray value") may be selected from the first gray value and the second gray value based on a numerical relationship among the first gray value, the second gray value, and a third gray value (also referred to as the "initial gray value") of the pixel $P_i$ to be processed.

In 608, the third gray value of the pixel $P_i$ to be processed may be adjusted based on the selected gray value.

In some embodiments of the present disclosure, in order to achieve an effect in which white edges become brighter and thinner and black edges become darker and thicker, a gray value used for enhancing the pixel $P_i$ to be processed may be selected from the first gray value and the second gray value, and the third gray value of the pixel $P_i$ to be processed may be adjusted based on the selected gray value.

As used herein, enhancing a pixel may be interpreted as increasing a difference between an intensity (e.g., the gray value) of the pixel to be processed and intensities of pixels around the pixel to be processed to achieve a sharpening effect.

As used herein, the grayscale image refers to a monochrome image having 0 to 256 gray levels (or gray values) from black to white. That is to say, in the grayscale image, there is only luminance information but no color information. The luminance of the grayscale image may change from dark to bright and the gray values (i.e., values of the luma component) of pixels may change from small to large. The higher the gray level of a pixel is, the higher the luminance may be, and the closer to white the pixel may be. Conversely, the lower the gray level is, the darker the luminance may be, and the closer to black the pixel may be.

Specifically, in some embodiments of the present disclosure, in order to achieve the purpose of enhancing the pixel $P_i$ to be processed, an enhancement approach in frequency domain may be used to adjust the third gray value of the pixel $P_i$ to be processed. For example, the third gray value of the pixel $P_i$ to be processed may be adjusted according to the following equation (1):

$$Y_3 = \frac{1}{K_2}(Y_1 + Y_2) + \frac{K_1}{K_2}(Y_1 - Y_2), \tag{1}$$

where $Y_3$ refers to a third gray value of the pixel $P_i$ to be processed after the adjustment (also referred to as the "adjusted gray value"); $Y_1$ refers to the third gray value of the pixel $P_i$ to be processed before the adjustment (also referred to as the "initial gray value"); $Y_2$ refers to the selected gray value; $K_1$ refers to a first enhancement coefficient which is a natural number or a decimal greater than 1; and $K_2$ refers to a second enhancement coefficient which is a natural number or a decimal greater than zero. Preferably, the value of $K_2$ may be 2. When the value of $K_2$ is 2, the larger the value of $K_1$ is, the greater the enhancement degree of the pixel $P_i$ to be processed may be.

In some embodiments, the value of $K_1$ may be related to the local contrast of the pixel $P_i$ to be processed and/or the global contrast of the image to be processed. The larger the local contrast of the pixel $P_i$ to be processed and/or the global contrast of the target image are, the smaller the value of $K_1$ may be. The smaller the local contrast of the pixel $P_i$ to be processed and/or the global contrast of the target image are, the larger the value of $K_1$ may be. In some embodiments, the value of $K_2$ and/or the value of $K_1$ may be default settings of the image processing system 100 or may be adjustable under different situations. For example, the value of $K_2$ and/or the value of $K_1$ may be dynamically adjusted according to a desired enhancement degree of the target image. In some embodiments, the value of $K_2$ and/or the value of $K_1$ may be defined by a user via a user interface of the user device 140.

Specifically, the ways in which the gray value $Y_2$ is determined may be classified as the following situations:

Situation 1: the third gray value is a maximum value or a minimum value.

In response to the determination that the first gray value and the second gray value are both less than the third gray value, the smaller gray value may be selected from the first gray value and the second gray value.

In response to the determination that the first gray value and the second gray value are both greater than the third gray value, the larger gray value may be selected from the first gray value and the second gray value.

When the third gray value is the maximum value or the minimum value, a gray value with a relatively large difference between the gray value and the third gray value may be selected, which may increase the enhancement effect of the pixel $P_i$ to be processed. As used herein, "the difference between the gray value and the third gray value is relatively large" refers to that an absolute value of the difference is relatively large.

When the third gray value is the maximum value, it indicates that the pixel $P_i$ to be processed is located on a white edge relative to the pixels on two sides. Selecting the smaller gray value from the first gray value and the second gray value to enhance the pixel $P_i$ to be processed may increase the third gray value, which can achieve the effect in which the white edge becomes brighter.

When the third gray value is a minimum value, it indicates that the pixel $P_i$ to be processed is located on a black edge relative to the pixels on the two sides. Selecting the larger gray value from the first gray value and the second gray value to enhance the pixel $P_i$ to be processed may decrease the third gray value, which can achieve the effect in which the black edge becomes darker.

Situation 2: The third gray value is an intermediate value.

In response to the determination that the third gray value is greater than the first gray value and less than the second gray value, the second gray value may be selected from the first gray value and the second gray value.

In response to the determination that the third gray value is greater than the second gray value and less than the first gray value, the first gray value may be selected from the first gray value and the second gray value.

When the third gray value is an intermediate value, a gray value larger than the third gray value may be selected to enhance the pixel $P_i$ to be processed, so that the third gray value may be decreased. That is, the luminance of the pixel $P_i$ to be processed may be decreased, and thus a black region associated with the pixel $P_i$ to be processed becomes larger and a white region associated with the pixel $P_i$ to be processed becomes smaller, thereby achieving the effect in which black edges become thicker and white edges become thinner.

In addition, for each pixel to be processed in the image to be processed, when the sharpening processing is performed respectively for each of the plurality of predetermined directions, in response to the determination that a count of circular processing operations for performing the sharpening processing respectively for each pixel to be processed based on each of the plurality of predetermined directions satisfies a preset threshold, or when an instruction input by a user for ending the sharpening process for the image to be processed is received, it may be determined that the sharpening processing for the image to be processed has been completed.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system for image processing, comprising:
at least one storage medium including a set of instructions; and
at least one processor in communication with the at least one storage medium, wherein when executing the set of instructions, the at least one processor is directed to cause the system to:
obtain a target image to be processed, the target image including one or more target pixels to be processed;
for each of the one or more target pixels,
select one or more previous pixels and one or more subsequent pixels along a predetermined direction in the target image;
determine a first gray value based on the one or more previous pixels and a second gray value based on the one or more subsequent pixels;
select a target gray value from the first gray value and the second gray value based on an initial gray value of the target pixel, wherein to select the target gray value from the first gray value and the second gray value based on the initial gray value of the target pixel, the at least one processor is directed to cause the system to:
in response to the determination that the first gray value and the second gray value are smaller than the initial gray value of the target pixel, select the smaller one of the first gray value and the second gray value as the target gray value; and
determine an adjusted gray value of the target pixel based on the initial gray value and the target gray value.

2. The system of claim 1, wherein a count of subsequent pixels used for determining the second gray value is related to a global contrast of the target image.

3. The system of claim 1, wherein a count of previous pixels used for determining the first gray value is related to a local contrast of the target pixel.

4. The system of claim 1, wherein a count of subsequent pixels used for determining the second gray value is related to a local contrast of the target pixel.

5. The system of claim 1, wherein to determine the first gray value based on the one or more previous pixels and the second gray value based on the one or more subsequent pixels, the at least one processor is directed to cause the system to:
determine a weighted value of gray values of the one or more previous pixels as the first gray value, wherein for each of the one or more previous pixels, a weighting coefficient is related to a first distance between the previous pixel and the target pixel.

6. The system of claim 1, wherein to determine the first gray value based on the one or more previous pixels and the second gray value based on the one or more subsequent pixels, the at least one processor is directed to cause the system to:
determine a weighted value of gray values of the one or more subsequent pixels as the second gray value, wherein for each of the one or more subsequent pixels, a weighting coefficient is related to a second distance between the subsequent pixel and the target pixel.

7. The system of claim 1, wherein to select the target gray value from the first gray value and the second gray value based on the initial gray value of the target pixel, the at least one processor is directed to cause the system to:
in response to the determination that the first gray value and the second gray value are larger than the initial gray value of the target pixel, select the larger one of the first gray value and the second gray value as the target gray value.

8. The system of claim 1, wherein to select the target gray value from the first gray value and the second gray value based on the initial gray value of the target pixel, the at least one processor is directed to cause the system to:
in response to the determination that the initial gray value of the target pixel is larger than the first gray value and smaller than the second gray value, select the second gray value as the target gray value.

9. The system of claim 1, wherein to select the target gray value from the first gray value and the second gray value based on the initial gray value of the target pixel, the at least one processor is directed to cause the system to:
in response to the determination that the initial gray value of the target pixel is larger than the second gray value and smaller than the first gray value, select the first gray value as the target gray value.

10. The system of claim 1, wherein the predetermined direction includes at least one of a horizontal direction, a vertical direction, a direction along 45 degrees, or a direction along 135 degrees.

11. The system of claim 1, wherein the at least one processor is directed to cause the system further to:
determine luma component information of the target image in response to that the target image is a Red Green Blue (RGB) image.

12. The system of claim 1, wherein a count of previous pixels used for determining the first gray value is related to a global contrast of the target image.

13. A method for image processing, implemented on a computing device including at least one processor and at least one storage medium, the method comprising:
obtaining a target image to be processed, the target image including one or more target pixels to be processed;
for each of the one or more target pixels,
selecting one or more previous pixels and one or more subsequent pixels along a predetermined direction in the target image;
determining a first gray value based on the one or more previous pixels and a second gray value based on the one or more subsequent pixels;
selecting a target gray value from the first gray value and the second gray value based on an initial gray value of the target pixel, wherein the selecting a target gray value from the first gray value and the second gray value based on an initial gray value of the target pixel includes:
in response to the determination that the first gray value and the second gray value are smaller than the initial gray value of the target pixel, selecting the smaller one of the first gray value and the second gray value as the target gray value; and determining an adjusted gray value of the target pixel based on the initial gray value and the target gray value.

14. The method of claim 13, wherein determining a first gray value based on the one or more previous pixels and a second gray value based on the one or more subsequent pixels includes:

determining a weighted value of gray values of the one or more previous pixels as the first gray value, wherein for each of the one or more previous pixels, a weighting coefficient is related to a first distance between the previous pixel and the target pixel.

15. The method of claim 13, wherein determining a first gray value based on the one or more previous pixels and a second gray value based on the one or more subsequent pixels includes:

determining a weighted value of gray values of the one or more subsequent pixels as the second gray value, wherein for each of the one or more subsequent pixels, a weighting coefficient is related to a second distance between the subsequent pixel and the target pixel.

16. The method of claim 13, wherein selecting a target gray value from the first gray value and the second gray value based on an initial gray value of the target pixel includes:

in response to the determination that the first gray value and the second gray value are larger than the initial gray value of the target pixel, selecting the larger one of the first gray value and the second gray value as the target gray value.

17. The method of claim 13, wherein selecting a target gray value from the first gray value and the second gray value based on an initial gray value of the target pixel includes:

in response to the determination that the initial gray value of the target pixel is larger than the first gray value and smaller than the second gray value, selecting the second gray value as the target gray value.

18. The method of claim 13, wherein selecting a target gray value from the first gray value and the second gray value based on an initial gray value of the target pixel includes:

in response to the determination that the initial gray value of the target pixel is larger than the second gray value and smaller than the first gray value, selecting the first gray value as the target gray value.

\* \* \* \* \*